United States Patent
Tamura

(10) Patent No.: US 8,233,424 B2
(45) Date of Patent: Jul. 31, 2012

(54) WIRELESS COMMUNICATION SYSTEM, CONNECTION DEVICE, RELAY DEVICE AND REGISTERING METHOD

(75) Inventor: Yoshiteru Tamura, Aichi (JP)

(73) Assignee: Buffalo Inc., Nagoya-shi (JP)

( * ) Notice: Subject to any disclaimer, the term of this patent is extended or adjusted under 35 U.S.C. 154(b) by 535 days.

(21) Appl. No.: 12/485,356

(22) Filed: Jun. 16, 2009

(65) Prior Publication Data

US 2009/0310528 A1    Dec. 17, 2009

(30) Foreign Application Priority Data

Jun. 17, 2008   (JP) .................................. 2008-158363

(51) Int. Cl.
  *H04B 7/14* (2006.01)
(52) U.S. Cl. ........................................ 370/315; 370/310
(58) Field of Classification Search ........... 370/310–350
  See application file for complete search history.

(56) References Cited

U.S. PATENT DOCUMENTS

| | | | | |
|---|---|---|---|---|
| 2004/0196822 A1* | 10/2004 | Proctor, Jr. | ..................... | 370/349 |
| 2005/0220054 A1* | 10/2005 | Meier et al. | ..................... | 370/331 |
| 2005/0238172 A1* | 10/2005 | Tamura | ..................... | 380/270 |
| 2006/0034235 A1* | 2/2006 | Yamane | ..................... | 370/338 |
| 2006/0039341 A1* | 2/2006 | Ptasinski et al. | ..................... | 370/338 |
| 2006/0256741 A1* | 11/2006 | Nozaki | ..................... | 370/278 |
| 2007/0047477 A1* | 3/2007 | Zheng | ..................... | 370/328 |
| 2007/0076642 A1* | 4/2007 | Chien et al. | ..................... | 370/310 |
| 2009/0262718 A1* | 10/2009 | Meier et al. | ..................... | 370/338 |

FOREIGN PATENT DOCUMENTS

| | | |
|---|---|---|
| JP | 2005-192059 | 7/2005 |
| JP | 2006-319676 | 11/2006 |
| JP | 2007-28124 | 2/2007 |
| JP | 2007-158896 | 6/2007 |
| WO | WO 2007/024357 A2 | 3/2007 |

* cited by examiner

*Primary Examiner* — Steven H Nguyen
*Assistant Examiner* — Kenan Cehic
(74) *Attorney, Agent, or Firm* — Oblon, Spivak, McClelland, Maier & Neustadt, L.L.P.

(57) ABSTRACT

A wireless communication system is provided. The wireless communication system includes a connection device which configures a first LAN which is a wireless LAN; a relay device which configures a second LAN different from the first LAN and relays data between a LAN terminal connected to the second LAN and the connection device; an authentication connection section which connects the relay device to the connection device through the first LAN by executing authentication conforming to an infrastructure mode based on a request from the relay device to the connection device; and a data transfer section which transfers data to be communicated between the LAN terminal and the connection device by using a data frame conforming to a wireless distribution system between the connection device and the relay device connected by the authentication connection section.

8 Claims, 11 Drawing Sheets

FIG. 8

ASSIGNMENT TABLE (282)

| REGISTRATION NUMBER (2822) | MAC ADDRESS (2824) | ATTRIBUTE (2826) |
|---|---|---|
| STA01 | 00:11:22:33:44:01 | STA (TERMINAL STATION) |
| STA02 | 00:11:22:33:44:02 | STA (TERMINAL STATION) |
| STA03 | 00:11:22:33:44:03 | STA (TERMINAL STATION) |
| STA04 | 00:11:22:33:44:04 | STA (TERMINAL STATION) |
| ⋮ | ⋮ | ⋮ |

FIG. 9

282
ASSIGNMENT TABLE

| REGISTRATION NUMBER (2822) | MAC ADDRESS (2824) | ATTRIBUTE (2826) |
|---|---|---|
| STA01 | 00:11:22:33:44:01 | STA (TERMINAL STATION) |
| STA02 | 00:11:22:33:44:02 | STA (TERMINAL STATION) |
| STA03 | 00:11:22:33:44:03 | STA (TERMINAL STATION) |
| STA04 | 00:11:22:33:44:04 | WSTA (SPECIAL TERMINAL STATION) |
| ⋮ | ⋮ | ⋮ |

WIRELESS COMMUNICATION SYSTEM, CONNECTION DEVICE, RELAY DEVICE AND REGISTERING METHOD

CROSS-REFERENCE TO RELATED APPLICATION

This application claims priority from Japanese Patent Application No. 2008-158363, filed on Jun. 17, 2008, the entire subject matter of which is incorporated herein by reference.

BACKGROUND OF THE INVENTION

1. Field of the Invention

The present invention relates to a wireless communication technology using a wireless local area network (LAN).

2. Description of the Related Art

A network configuration of a wireless LAN conforming to IEEE802.11 standard includes an infrastructure mode and a wireless distribution system (WDS) mode. A network in the infrastructure mode is configured between a base station for configuring a wireless LAN and a terminal station connected to the wireless LAN. A network in the WDS mode is configured between base stations.

Japanese Patent Application Publication No. 2007-28124 describes a wireless communication system including a connection device as a first base station for configuring a first wireless LAN and a relay device as a second base station for configuring a second wireless LAN. The relay device functions as a terminal station in the infrastructure mode for the first wireless LAN and functions as a base station in the infrastructure mode for the second wireless LAN. Accordingly, the relay device relays a data frame to be communicated between a terminal as a terminal station connected to the second wireless LAN and the connection device as the first base station. The relay device prepares a table associating an IP address of a network layer address and a Media Access Control (MAC) address of a link layer address with each other and a destination MAC address of a data frame is converted using the table, so that the relay device can relay data transferred through the connection device to each of the terminals.

Since the above-described wireless communication system executes address conversion in the relay device using the table associating an IP address of a network layer address and a MAC address of a link layer address with each other, data that can be relayed in the wireless communication system is limited to data conforming to a specific communication protocol set in the relay device. For example, in a case in which the relay device supports only IPv4, if a node in a wide area network or a communication device such as a connection device or a wireless LAN terminal supports not only IPv4, but also IPv6, an IPv6 packet cannot be converted in the relay device. Therefore, if communication according to IPv6 is conducted through the relay device, a communication failure occurs. It may be preferable that the wireless communication system should be able to relay not only data conforming to IPv4, for example, but also data conforming to any other communication protocol of IPv6, IPX, SPX and the like.

SUMMARY OF THE INVENTION

Accordingly, it is an aspect of the present invention to provide a technology for relaying data between a wireless LAN and another LAN independently of a specific communication protocol.

According to an exemplary embodiment of the present invention, there is provided a wireless communication system comprising: a connection device which configures a first LAN which is a wireless LAN; a relay device which configures a second LAN different from the first LAN and relays data between a LAN terminal connected to the second LAN and the connection device; an authentication connection section which connects the relay device to the connection device through the first LAN by executing authentication conforming to an infrastructure mode based on a request from the relay device to the connection device; and a data transfer section which transfers data to be communicated between the LAN terminal and the connection device by using a data frame conforming to a wireless distribution system between the connection device and the relay device connected by the authentication connection section.

According to another exemplary embodiment of the present invention, there is provided a connection device which configures a first LAN which is a wireless LAN. The device comprises: a connection setting section which connects a relay device to the first LAN by executing authentication conforming to an infrastructure mode based on a request received from the relay device which configures a second LAN different from the first LAN; and a data communication section which communicates data to be transferred to and from a LAN terminal connected to the second LAN by using a data frame conforming to a wireless distribution system, with the relay device connected by the connection setting section.

According to another exemplary embodiment of the present invention, there is provided a relay device which configures a second LAN different from a first wireless LAN which is a wireless LAN configured by a connection device and relays data to be communicated between a LAN terminal connected to the second LAN and the connection device. The relay device comprises: a connection request section which requests connection to the connection device and is connected to the connection device through the first wireless LAN by authentication conforming to an infrastructure mode executed in the connection device based on the request; and a data relaying section which relays data to be communicated between the LAN terminal and the connection device by using a data frame conforming to a wireless distribution system with the connection device connected by the connection request section.

According to another exemplary embodiment of the present invention, there is provided a method for registering a relay device in a connection device which configures a first wireless LAN which is a wireless LAN. The method comprises: transmitting a connection request from the relay device to the connection device; in response to the connection request, executing authentication conforming to an infrastructure mode in the connection device; registering an attribute of the relay device in the connection device as a terminal station in the infrastructure mode; transmitting a signal from the relay device to the connection device; and changing the attribute of the relay device registered in the connection device from the terminal station to a specific terminal station for executing data communication using a data frame conforming to a wireless distribution system.

BRIEF DESCRIPTION OF THE DRAWINGS

In the accompanying drawings:

FIG. 8 is a schematic representation showing an example of an assignment table in the connection device;

FIG. 9 is a schematic representation showing an example of the assignment table in the connection device;

DETAILED DESCRIPTION OF THE INVENTION

To more clarify the configuration and the function of the present invention, a wireless communication system according to embodiments of the present invention will be described.

A. Embodiment

A1. Configuration of a Wireless Communication System

Figure 1:
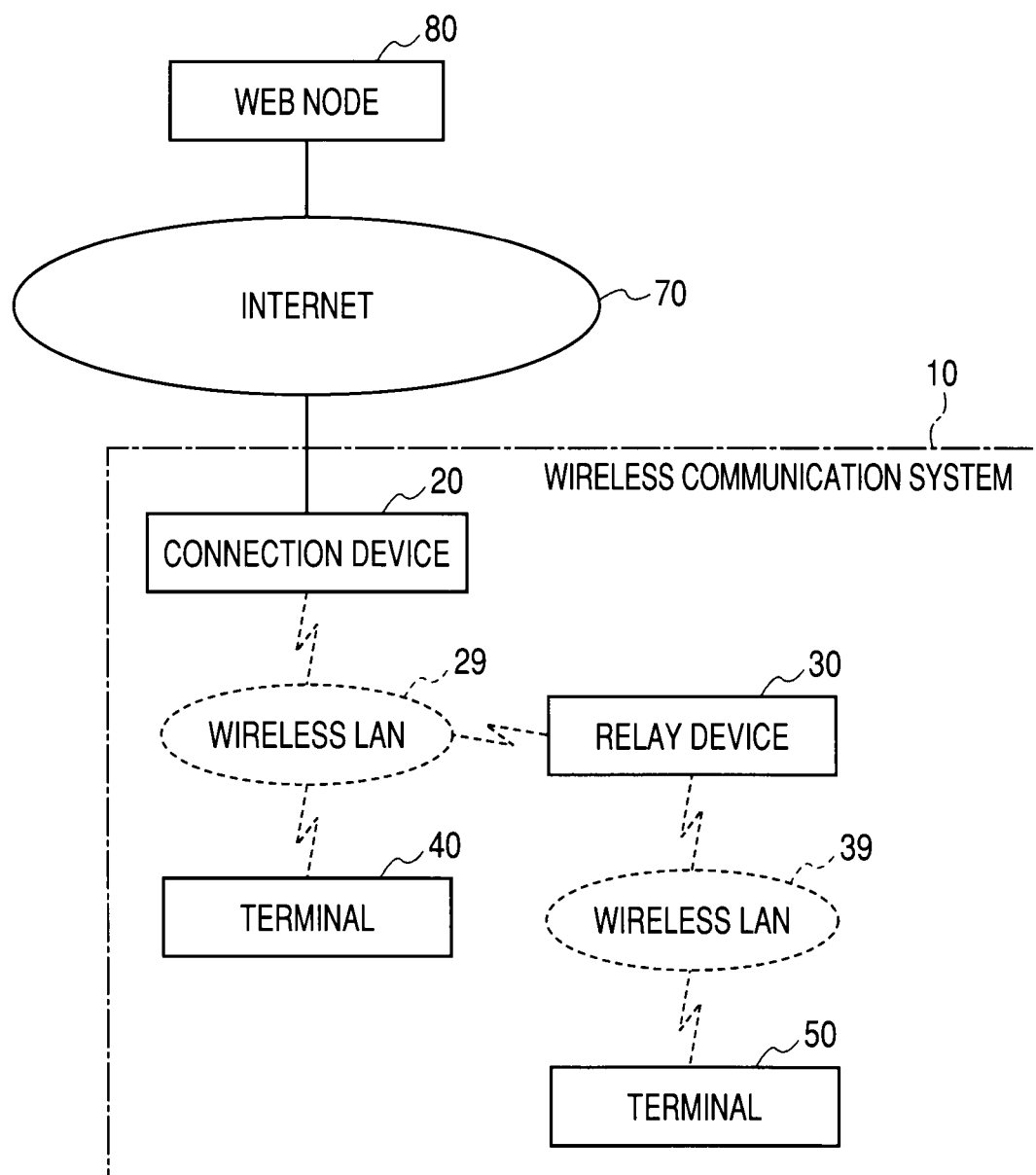
FIG. 1 is a schematic representation showing the configuration of a wireless communication system.

FIG. 1 is a schematic representation showing the configuration of a wireless communication system 10. The wireless communication system 10 includes a connection device 20, a relay device 30, and terminals 40 and 50. The connection device 20, the relay device 30, and the terminals 40 and 50 in the wireless communication system 10 are wireless LAN communication devices conforming to the IEEE802.11 standard.

The connection device 20 of the wireless communication system 10 is a wireless LAN connection device also called as a wireless LAN access point. The connection device 20 configures a wireless LAN 29 conforming to the IEEE802.11 standard. In the embodiment, the relay device 30 and the terminal 40 are connected to the wireless LAN 29 configured by the connection device 20. The connection device 20 has a routing function for connecting the wireless LAN 29 to the Internet 70 as an external network of the wireless communication system 10 and relays data transferred between the relay device 30 and the terminal 40 connected to the wireless LAN 29, and a web node 80 (for example, a personal computer, a web server, or a mail server) connected to the Internet 70. The routing function of the connection device 20 is not limited to connection to the Internet 70 and may be connection to any other wide area network (WAN) or LAN. In the example of FIG. 1, one relay device 30 and one terminal 40 are connected to the wireless LAN 29 configured by the connection device 20, however, the connection device 20 according to the embodiment enables four relay devices and 12 terminals to be connected to the wireless LAN 29 at the same time. The configuration and the operation of the connection device 20 are described later in detail.

The relay device 30 of the wireless communication system 10 is also called as a wireless LAN repeater. It configures a wireless LAN 39 conforming to the IEEE802.11 standard and different from the wireless LAN 29 configured by the connection device 20. In the embodiment, the terminal 50 is connected to the wireless LAN 39 configured by the relay device 30. The relay device 30 connects to the connection device 20 through the wireless LAN 29 through authentication conforming to the infrastructure mode based on a request to the connection device 20. The relay device 30 relays data transferred between the terminal 50 and the connection device 20 using a data frame conforming to the WDS mode with the connection device 20 connected by executing authentication conforming to the infrastructure mode. In the example of FIG. 1, one terminal 50 is connected to the wireless LAN 39 configured by the relay device 30, however, the relay device 30 according to the embodiment enables 12 terminals to be connected to the wireless LAN 39 at the same time. The configuration and the operation of the relay device 30 are described later in detail.

Figure 2:
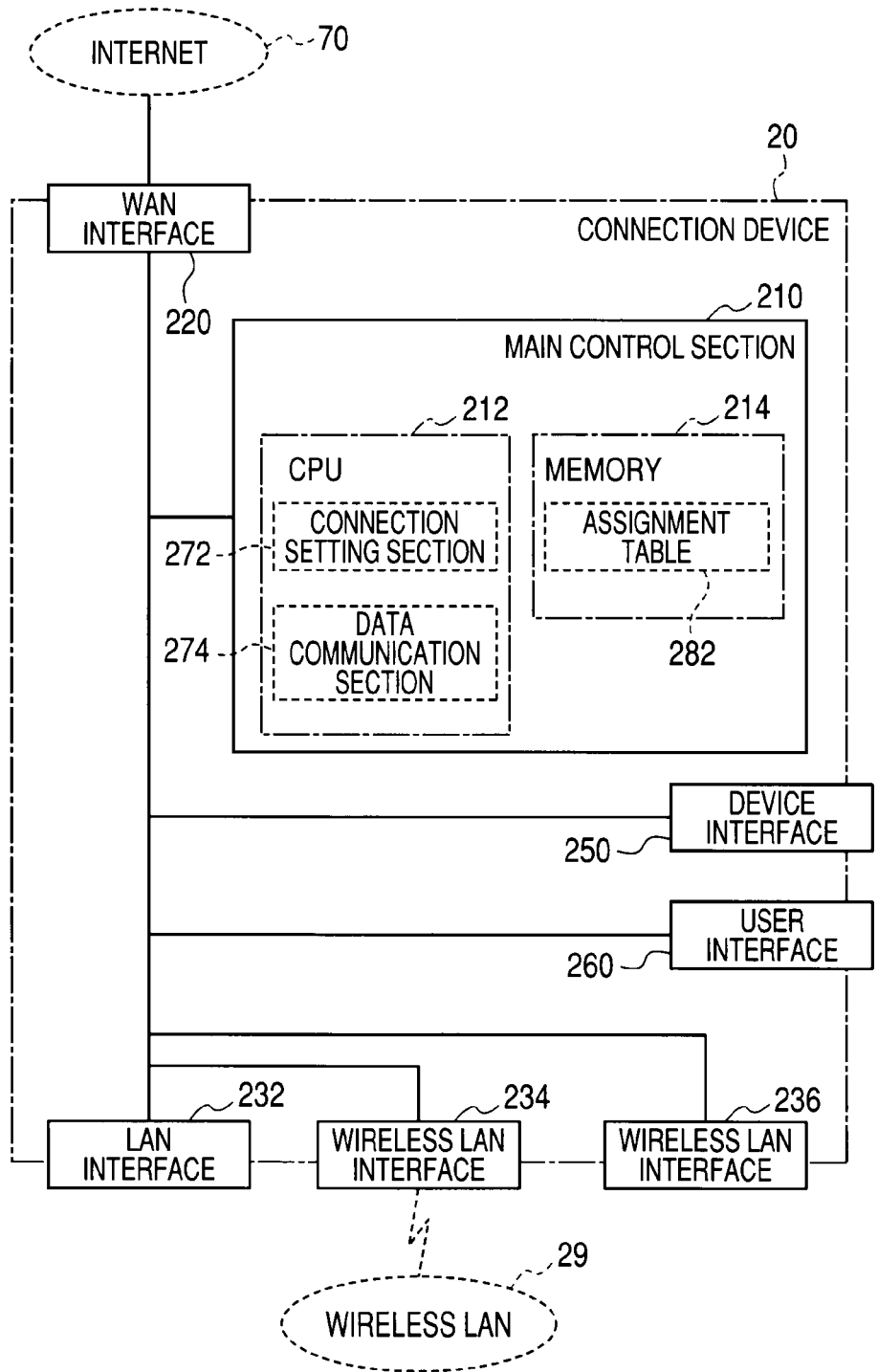
FIG. 2 is a schematic representation showing the configuration of a connection device in the wireless communication system.

FIG. 2 is a schematic representation showing the configuration of the connection device 20 in the wireless communication system 10. The connection device 20 includes a main control section 210, a WAN interface 220, a LAN interface 232, wireless LAN interfaces 234 and 236, a device interface 250, and a user interface 260.

The main control section 210 of the connection device 20 includes a central processing unit (CPU) 212 and a memory 214, and controls the sections of the connection device 20. In the embodiment, the CPU 212 of the main control section 210 functions as a connection setting section 272 and a data communication section 274 based on software. The CPU 212 functioning as the connection setting section 272 connects the relay device 30 to the wireless LAN 29 by executing authentication conforming to the infrastructure mode based on (in response to) a request received from the relay device 30. The CPU 212 functioning as the data communication section 274 communicates data transferred to and from the relay device 30 connected by the connection setting section 272 using a data frame conforming to the WDS mode. The memory 214 of the main control section 210 stores an assignment table 282. The assignment table 282 in the memory 214 registers therein nodes including the relay device 30 and the terminal 40 connected to the wireless LAN 29 in the infrastructure mode conforming to the IEEE802.11 standard. The CPU 212 functioning as the connection setting section 272 also functions as an assignment management section for managing the assignment table 282. The assignment table 282 is described later in detail.

The WAN interface 220 of the connection device 20 transfers data to and from a wide area network including the Interface 70. The LAN interface 232 of the connection device 20 transfers data to and from a wired LAN conforming to the IEEE802.3 standard. The wireless LAN interface 234 of the connection device 20 transfers data to and from a wireless LAN conforming to the IEEE802.11a standard. The wireless LAN interface 236 of the connection device 20 transfers data to and from a wireless LAN conforming to the IEEE802.11b standard and the IEEE802.11g standard. In the embodiment, the wireless LAN 29 of the connection device 20 is configured as a wireless LAN conforming to the IEEE802.11a standard by the wireless LAN interface 234, however, may be configured as a wireless LAN conforming to the IEEE802.11b standard or the IEEE802.11g standard by the wireless LAN interface 236.

The device interface 250 of the connection device 20 is directly connected to a personal computer for making various settings of the connection device 20. In the embodiment, the device interface 250 includes an interface conforming to the Universal Serial Bus (USB) standard. The user interface 260 of the connection device 20 includes input buttons and indication lamps for allowing the user to make direct settings of the connection device 20.

Figure 3:
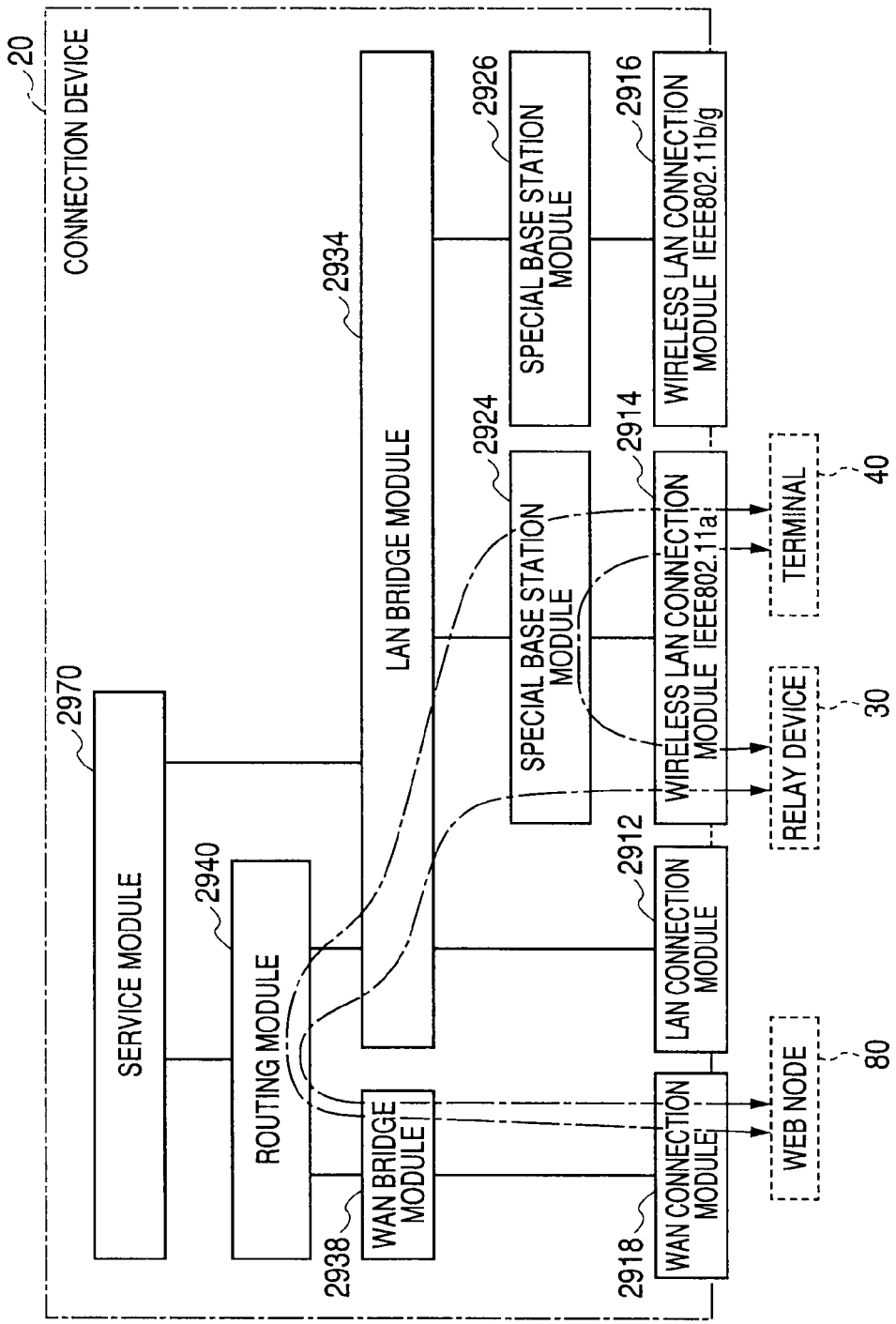
FIG. 3 is a schematic representation to schematically show the communication function of the connection device.

FIG. 3 is a schematic representation showing the communication function of the connection device 20. The connection device 20 includes a LAN connection module 2912, wireless LAN connection modules 2914 and 2916, a WAN connection module 2918, special base station modules 2924 and 2926, a LAN bridge module 2934, a WAN bridge module 2938, a routing module 2940, and a service module 2970. The communication function modules in the connection device 20 are implemented according to control based on computation processing of the main control section 210 of the connection device 20.

The wireless LAN connection module 2914 of the connection device 20 controls data transfer to and from a wireless LAN conforming to the IEEE802.11a standard including the wireless LAN 29. The wireless LAN connection module 2916 of the connection device 20 controls data transfer to and from a wireless LAN conforming to the IEEE802.11b standard or the IEEE802.11g standard. The WAN connection module 2918 of the connection device 20 controls data transfer to and from the Internet 70 conforming to the IEEE802.3 standard. The LAN connection module 2912 of the connection device 20 controls data transfer to and from a LAN conforming to the IEEE802.3 standard.

The special base station module 2924 of the connection device 20 controls as a base station, data transfer to and from network nodes including the relay device 30 and the terminal 40 directly connected to the wireless LAN 29 through the wireless LAN connection module 2914. The special base station module 2924 can execute data transfer by properly using either one of the infrastructure mode and the WDS mode. For the terminal 40, the special base station module 2924 functions as a base station in the infrastructure mode from authentication connection through data transfer. For the relay device 30, the special base station module 2924 functions as a base station in the infrastructure mode at the authentication connection time and functions as a base station in the WDS mode at the data transfer time. The special base station module 2926 of the connection device 20 controls as a base station, data transfer to and from network nodes directly connected to the wireless LAN through the wireless LAN connection module 2916. Similarly to the special base station module 2924, the special base station module 2926 can execute data transfer by properly using either one of the infrastructure mode and the WDS mode.

The LAN bridge module 2934 of the connection device 20 controls data transfer between networks managed by the LAN connection module 2912 and the special base station modules 2924 and 2926. The WAN bridge module 2938 of the connection device 20 controls data transfer to and from a web node 80 connected through the WAN connection module 2918. The routing module 2940 of the connection device 20 controls data transfer between the LAN bridge module 2934 and the WAN bridge module 2938. The service module 2970 of the connection device 20 provides a web user interface for managing the connection device 20 with a web browser for the user managing the connection device 20 through the routing module 2940 and the LAN bridge module 2934.

Figure 4:
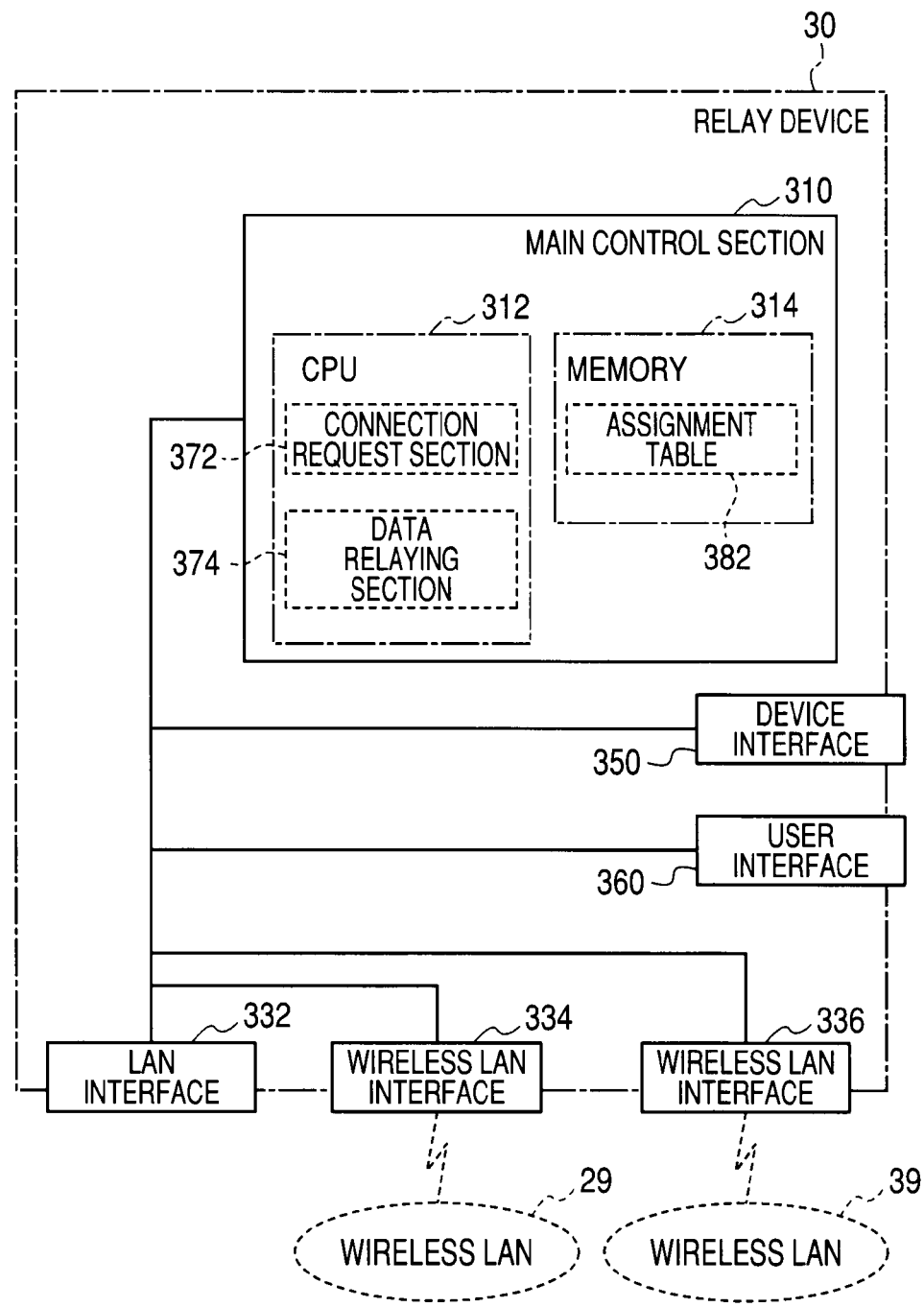
FIG. 4 is a schematic representation showing the configuration of a relay device in the wireless communication system.

FIG. 4 is a schematic representation showing the configuration of the relay device 30 in the wireless communication system 10. The relay device 30 includes a main control section 310, a LAN interface 332, wireless LAN interfaces 334 and 336, a device interface 350, and a user interface 360.

The main control section 310 of the relay device 30 includes a CPU 312 and a memory 314 and controls the sections of the relay device 30. In the embodiment, the CPU 312 of the main control section 310 functions as a connection request section 372 and a data relaying section 374 based on software. The CPU 312 functioning as the connection request section 372 connects to the connection device 20 through the wireless LAN 29 by executing authentication conforming to the infrastructure mode based on (in response to) a request sent to the connection device 20. The CPU 312 functioning as the data relaying section 374 relays data transferred between the terminal 50 and the connection device 20 using a data frame conforming to the WDS mode with the connection device 20 connected by the connection request section 372. The memory 314 of the main control section 310 stores an assignment table 382. The assignment table 382 of the memory 314 registers therein nodes including the terminal 50 connected to the wireless LAN 39 in the infrastructure mode conforming to the IEEE802.11 standard.

The LAN interface 332 of the relay device 30 transfers data to and from a wired LAN conforming to the IEEE802.3 standard. The wireless LAN interface 334 of the relay device 30 transfers data to and from a wireless LAN conforming to the IEEE802.11a standard. The wireless LAN interface 336 of the relay device 30 transfers data to and from a wireless LAN conforming to the IEEE802.11b standard and the IEEE802.11g standard. In the embodiment, the wireless LAN 39 of the relay device 30 is configured as a wireless LAN conforming to the IEEE802.11b standard by the wireless LAN interface 336, and the relay device 30 connects to the wireless LAN 29 configured by the connection device 20 through the wireless LAN interface 334. In the embodiment, the wireless LAN 39 is configured as a wireless LAN conforming to the IEEE802.11b standard by the wireless LAN interface. However, in another embodiment, a wired LAN conforming to the IEEE802.3 standard may be configured by the LAN interface 332 as a LAN 39 through which the 50 is connected to the relay device 30.

The device interface 350 of the relay device 30 is directly connected to a personal computer for making various settings of the relay device 30. In the embodiment, the device interface 350 includes an interface conforming to the USB standard. The user interface 360 of the relay device 30 includes input buttons and indication lamps for allowing the user to make direct settings of the relay device 30.

Figure 5:
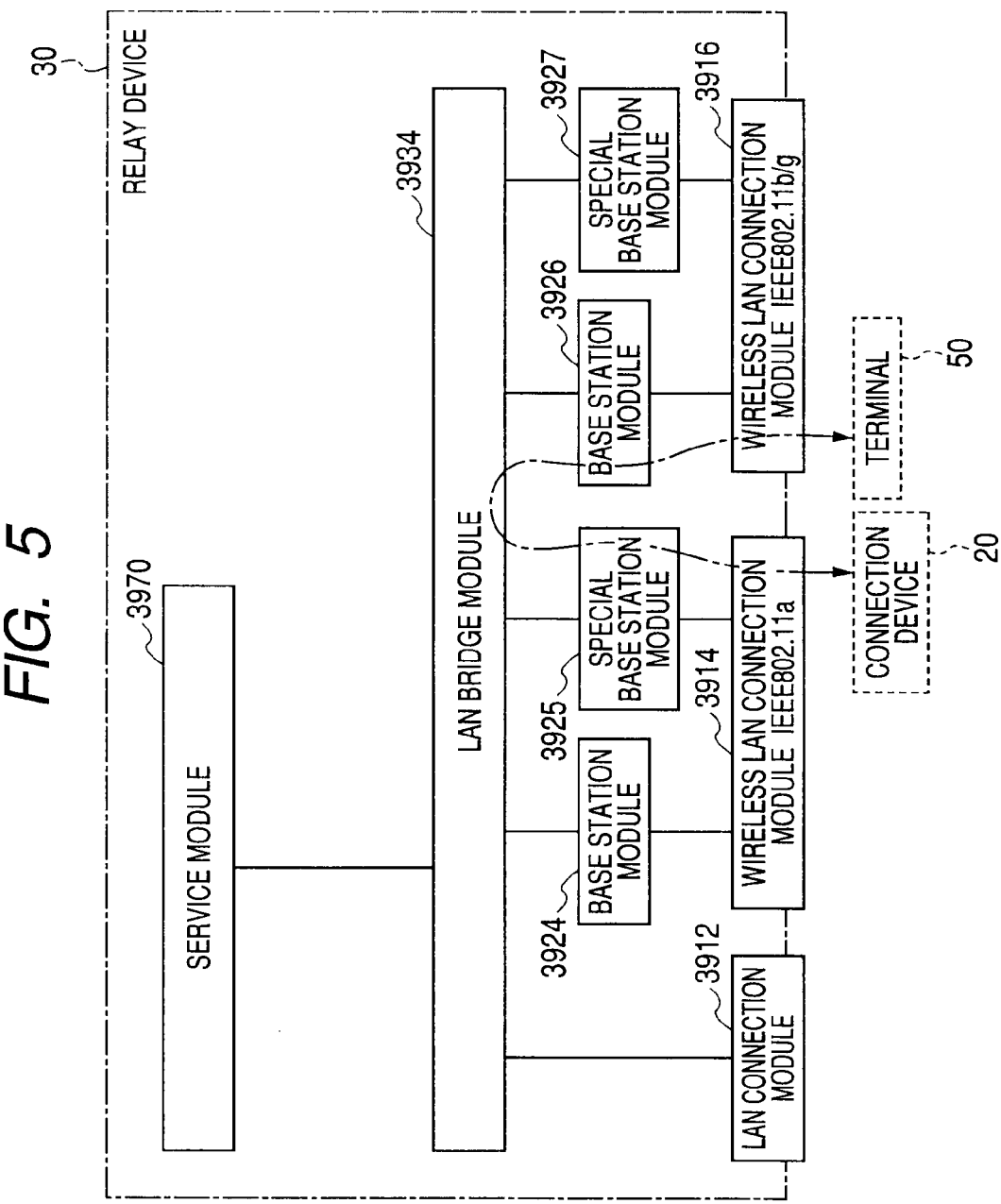
FIG. 5 is a schematic representation showing the communication function of the relay device.

FIG. 5 is a schematic representation showing the communication function of the relay device 30. The relay device 30 includes a LAN connection module 3912, wireless LAN connection modules 3914 and 3916, base station modules 3924 and 3926, special terminal station modules 3925 and 3927, a LAN bridge module 3934, and a service module 3970. The communication function modules in the relay device 30 are implemented according to control based on computation processing of the main control section 310 of the relay device 30.

The wireless LAN connection module 3914 of the relay device 30 controls data transfer to and from a wireless LAN conforming to the IEEE802.11a standard including the wireless LAN 29. The wireless LAN connection module 3916 of the relay device 30 controls data transfer to and from a wireless LAN conforming to the IEEE802.11b standard or the IEEE802.11g standard including the wireless LAN 39. The LAN connection module 3912 of the relay device 30 controls data transfer to and from a LAN conforming to the IEEE802.3 standard.

The base station module 3924 of the relay device 30 controls as a base station, data transfer to and from network nodes directly connected to the wireless LAN through the wireless LAN connection module 3914. The special base station module 3926 of the relay device 30 controls as a base station, data transfer to and from network nodes including the terminal 50 directly connected to the wireless LAN 39 through the wireless LAN connection module 3916.

The special terminal station module 3925 of the relay device 30 controls as a special terminal station, data transfer to and from base stations including the connection device 20 directly connected to the wireless LAN 29 through the wireless LAN connection module 3914 in the WDS mode. The special terminal station module 3927 of the relay device 30 controls as a special terminal station, data transfer to and from base stations directly connected to the wireless LAN through the wireless LAN connection module 3916 in the WDS mode.

The LAN bridge module 3934 of the relay device 30 controls data transfer between networks managed by the LAN connection module 3912, the base station modules 3924 and 3926, and the special terminal station modules 3925 and 3927. The service module 3970 of the relay device 30 provides a web user interface for managing the relay device 30 with a web browser for the user managing the relay device 30 through the LAN bridge module 3934.

In the embodiment, the connection device 20 and the relay device 30 have different configurations. However, in another embodiment, the connection device 20 and the relay device 30 may have the same configuration and may be operated as different devices by switching the function of the connection device 20 and the function of the relay device 30. Further, in the embodiment, the terminal 50 is connected to the relay device 30 through the wireless LAN 39. However, in another embodiment, another relay device having the similar configuration to the relay device 30 may be connected to the relay device 30, and the terminal 50 may be connected to the other relay device through a wireless LAN configured by the other relay device. In this other embodiment, the relay device 30 may operate similarly to the connection device 20 and the other relay device may operate similarly to the relay device 30. The connection setting section 272 of the connection device 20 and the connection request section 372 of the relay device 30 configure an authentication connection section in the wireless communication system 10, and the data communication section 274 of the connection device 20 and the data relaying section 374 of the relay device 30 configure a data transfer section in the wireless communication system 10.

Figure 6:
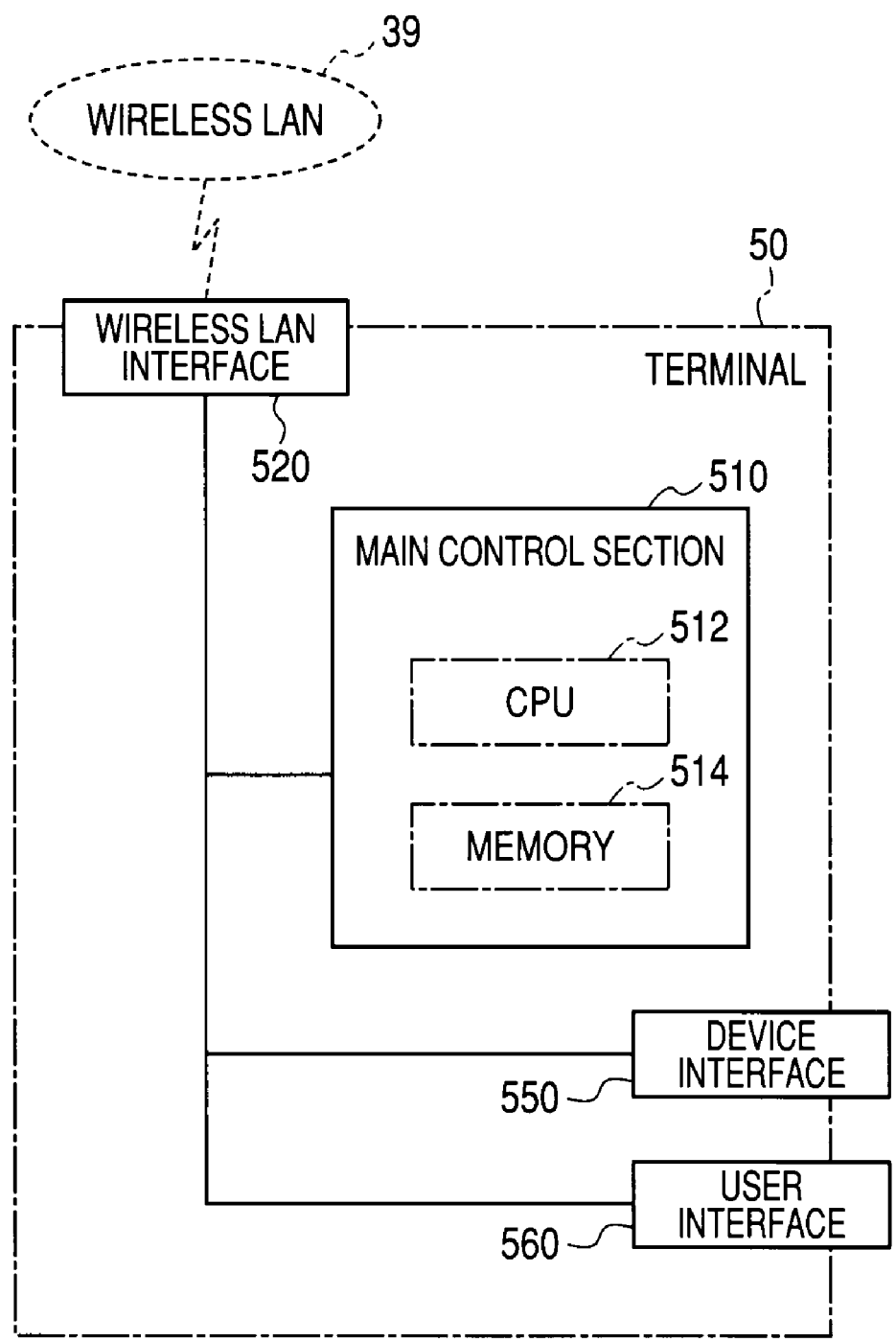
FIG. 6 is a schematic representation showing the configuration of a terminal in the wireless communication system.

FIG. 6 is a schematic representation showing the configuration of the terminal 50 in the wireless communication system 10. The terminal 50 includes a main control section 510, a wireless LAN interface 520, a device interface 550, and a user interface 560. The main control section 510 of the terminal 50 includes a CPU 512 and a memory 514, and controls the sections of the terminal 50. The wireless LAN interface 520 of the terminal 50 transfers data to and from a wireless LAN conforming to the IEEE802.11 standard including the wireless LAN 39. The device interface 550 of the terminal 50 is an interface connected to an external device. In the embodiment, the device interface 550 includes an interface conforming to the USB standard. The user interface 560 of the terminal 50 includes a keyboard for accepting information entry from the user and a monitor for outputting information to the user. The configuration of the terminal 40 is similar to the configuration of the terminal 50 shown in FIG. 6.

A2. Operation of Wireless Communication System

Figure 7:
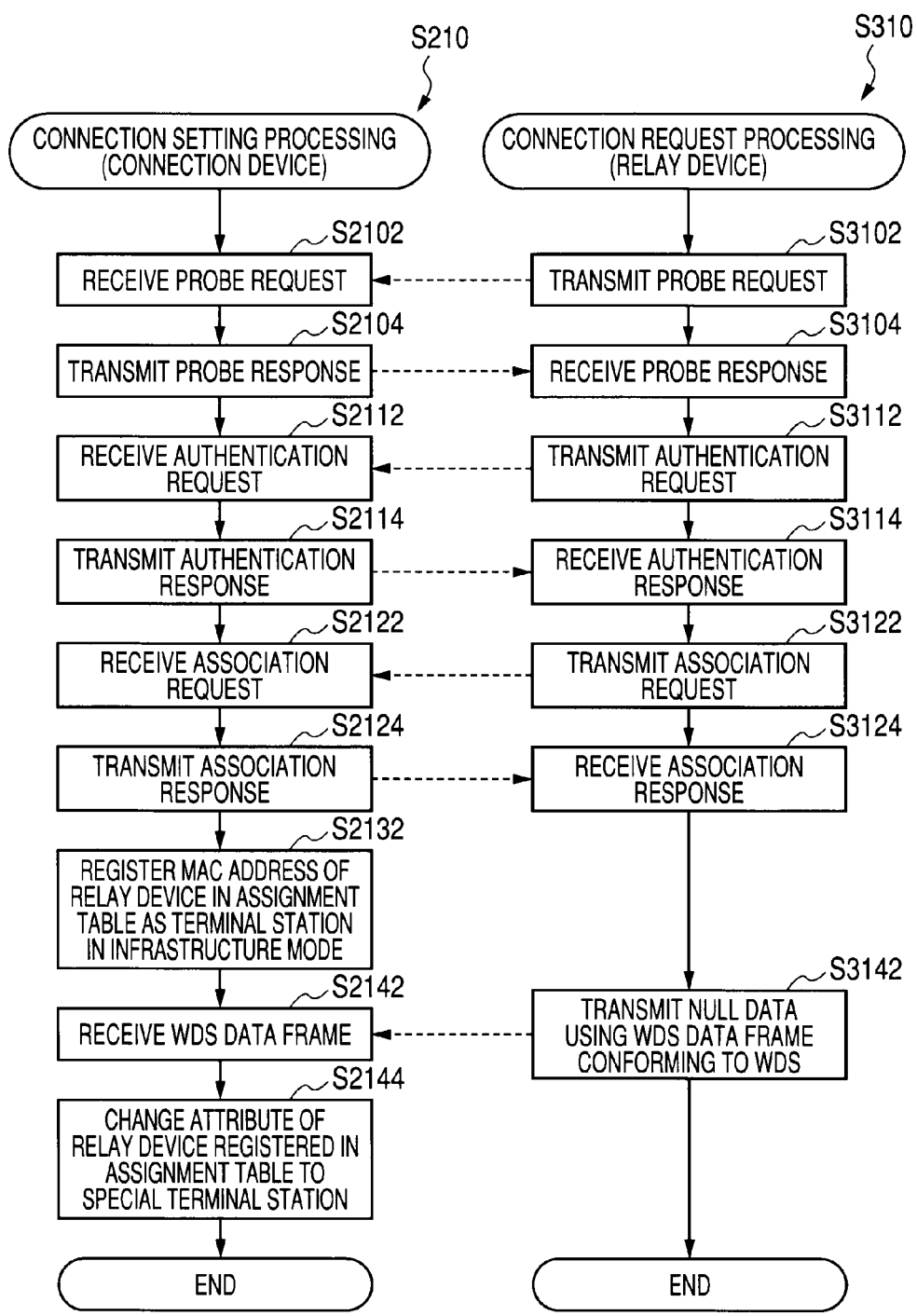
FIG. 7 is a flowchart showing connection setting processing executed by the connection device and connection request processing executed by the relay device.

FIG. 7 is a flowchart to show connection setting processing executed by the connection device 20 (step S210) and connection request processing executed by the relay device 30 (step S310). In the embodiment, upon reception of a probe request packet from the relay device 30, the connection device 20 of the wireless communication system 10 executes the connection setting processing (step S210) shown in FIG. 7. In the embodiment, the connection setting processing (step S210) shown in FIG. 7 is implemented as the CPU 212 of the main control section 210 operates based on software. As another embodiment, the connection setting processing (step S210) may be implemented as an electronic circuit of the main control section 210 operates based on the physical circuit configuration. In the embodiment, when an access request to the web node 80 from the terminal 50 associated with the wireless LAN 39 occurs in a state in which the relay device 30 is not connected to the wireless LAN 29 configured by the connection device 20, the relay device 30 of the wireless communication system 10 executes the connection request processing (step S310) shown in FIG. 7. In the embodiment, the connection request processing (step S310) in FIG. 7 is implemented as the CPU 312 of the main control section 310 operates based on software. As another embodiment, the connection request processing (step S310) may be implemented as an electronic circuit of the main control section 310 operates based on the physical circuit configuration.

When starting the connection request processing (step S310) shown in FIG. 7, the relay device 30 transmits a probe request packet in conformity with the infrastructure mode of the IEEE802.11 standard (step S3102). The connection device 20 starts the connection setting processing (step S210) shown in FIG. 7 upon receiving the probe request packet transmitted from the relay device 30 (step S2102), and transmits a probe response packet to the relay device 30 in conformity with the infrastructure mode of the IEEE802.11 standard (step S2104). Then, the relay device 30 receives the probe response packet transmitted from the connection device 20 (step S3104).

Upon the relay device 30 receives the probe response packet from the connection device 20 (step S3104), the relay device 30 transmits an authentication request to the connection device 20 in conformity with the infrastructure mode of the IEEE802.11 standard (step S3112). Then, the connection device 20 receives the authentication request transmitted from the relay device 30 (step S2112) and transmits an authentication response to the relay device 30 in conformity with the infrastructure mode of the IEEE802.11 standard (step S2114). Then, the relay device 30 receives the authentication response transmitted from the connection device 20 (step S3114). It is noted that since the authentication is executed in conformity with the infrastructure mode, a plurality of functions can be provided such as a Quality of Service (QoS), various levels of encryptions and the like, in contrast to the WDS mode. Accordingly, the authentication can be performed in a secure state according to a user's desire.

Upon the relay device 30 receives the authentication response from the connection device 20 (step S3114), the relay device 30 transmits an association request to the connection device 20 in conformity with the infrastructure mode of the IEEE802.11 standard (step S3122). Then, the connection device 20 receives the association request transmitted from the relay device 30 (step S2122) and transmits an association response to the relay device 30 in conformity with the infrastructure mode of the IEEE802.11 standard (step S2124). Then, the relay device 30 receives the association response transmitted from the connection device 20 (step S3124).

Upon the association response is transmitted from the connection device 20 to the relay device 30 (step S2124), the CPU 212 of the connection device 20 functions as a registration section, which is a part of the connection setting section 272, whereby the connection device 20 registers the MAC address of the relay device 30 in the assignment table 282 (step S2132). When the MAC address of the relay device 30 is registered in the assignment table 282, the attribute of the relay device 30 is registered in association with the MAC address of the relay device 30 as a terminal station in the infrastructure mode, similarly to the terminal 40 associated with the wireless LAN 29.

FIG. 8 is a schematic representation showing an example of the assignment table 282 in the connection device 20. The assignment table 282 includes a registration number field 2822, a MAC address field 2824, and an attribute field 2826. The registration number field 2822 of the assignment table 282 stores codes for identifying information registered in the assignment table 282. The MAC address field 2824 of the assignment table 282 stores the MAC addresses of the network nodes associated with the wireless LAN 29. The attribute field 2826 of the assignment table 282 stores information indicating the attributes of the network nodes corresponding to the registered MAC addresses. In the example shown in FIG. 8, the registration information concerning the relay device 30 in the assignment table 282 is shown as a registration number of STA04, a MAC address of 00:11:22:33:44:04, and an attribute of STA (terminal station).

Referring back to FIG. 7, upon the relay device 30 receives the association response from the connection device 20 (step S3124), the relay device 30 transmits null data to the connection device 20 using a data frame conforming to the WDS mode of the IEEE802.11 standard (step S3142). Then, upon the connection device 20 receives the data frame conforming to the WDS mode of the IEEE802.11 standard from the relay device 30 (step S2142), the CPU 212 of the connection device 20 functions as an attribute determination section, which is a part of the connection setting section 272, thereby determining that the relay device 30 is a special terminal station for executing data transfer using a data frame conforming to the WDS mode of the IEEE802.11 standard. In the embodiment, the relay device 30 is determined as a special terminal station based on the data frame in the WDS mode received from the relay device 30. However, the relay device 30 may be determined as a special terminal station based not only on the data frame in the WDS mode, but also on a signal sent from the relay device 30 to the connection device 20. For example, at the authentication connection time at which the relay device 30 is registered in the assignment table 282, the relay device 30 may be determined as a special terminal station based on a notification indicating that the relay device 30 is a special terminal station, sent from the relay device 30 to the connection device 20. Upon the relay device 30 is determined as a special terminal station (S2142), the CPU 212 of the connection device 20 functions as an attribute change section, which is a part of the connection setting section 272, whereby the connection device 20 changes the attribute in the attribute field 2826 associated with the MAC address of the transmission source in the data frame received from the relay device 30, of the MAC addresses registered in the assignment table 282 to a special terminal station for executing data transfer using a data frame conforming to the WDS mode of the IEEE802.11 standard (step S2144).

FIG. 9 is a schematic representation showing an example of the assignment table 282 in the connection device 20. The assignment table 282 shown in FIG. 9 shows a state in which the attribute of the relay device 30 in the assignment table 282 shown in FIG. 8 has been changed to a special terminal station. In the example shown in FIG. 9, the registration information regarding the relay device 30 in the assignment table 282 is shown as a registration number of STA04, a MAC address of 00:11:22:33:44:04, and an attribute of WSTA (special terminal station).

Figure 10:
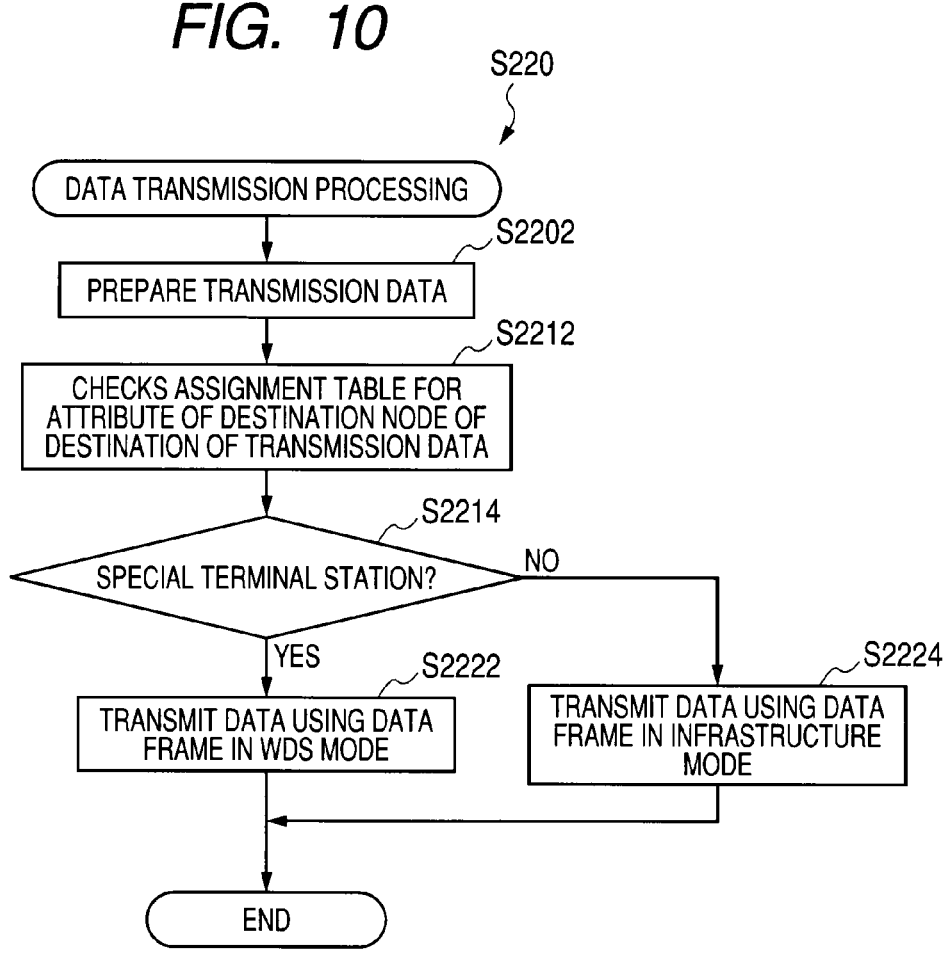
FIG. 10 is a flowchart showing data transmission processing executed by the connection device.

FIG. 10 is a flowchart to show data transmission processing executed by the connection device 20 (step S220). In the embodiment, to transmit data to a network node registered in the assignment table 282, the connection device 20 of the wireless communication system 10 executes the data transmission processing (step S220) shown in FIG. 10. In the embodiment, the data transmission processing (step S220) is implemented as the CPU 212 of the main control section 210 operates based on software. As another embodiment, the data transmission processing (step S220) may be implemented as an electronic circuit of the main control section 210 operates based on the physical circuit configuration.

Upon starting the data transmission processing (step S220) shown in FIG. 10, the connection device 20 prepares data (transmission data) to be transmitted to the network node registered in the assignment table 282 (step S2202). The data to be transmitted to the network node registered in the assignment table 282 includes data transferred from the web node 80 to the terminal 40, 50, data transferred from the terminal 40 to the terminal 50, or data transferred from the terminal 50 to the terminal 40, for example.

Upon the connection device 20 prepares the transmission data (step S2202), the CPU 212 of the connection device 20 functions as an attribute check section, which is a part of the data communication section 274, whereby the connection device 20 checks the assignment table 282 for the attribute of the destination node as the destination of the transmission data (step S2212). If the attribute of the destination node is "WSTA (special terminal station)" (YES at step S2214), the connection device 20 transmits the data using a data frame conforming to the WDS mode of the IEEE802.11 standard (step S2222). On the other hand, if the attribute of the destination node is "STA (terminal station)" (NO at step S2214), the connection device 20 transmits the data using a data frame conforming to the infrastructure mode of the IEEE802.11 standard (step S2224).

Figure 11:
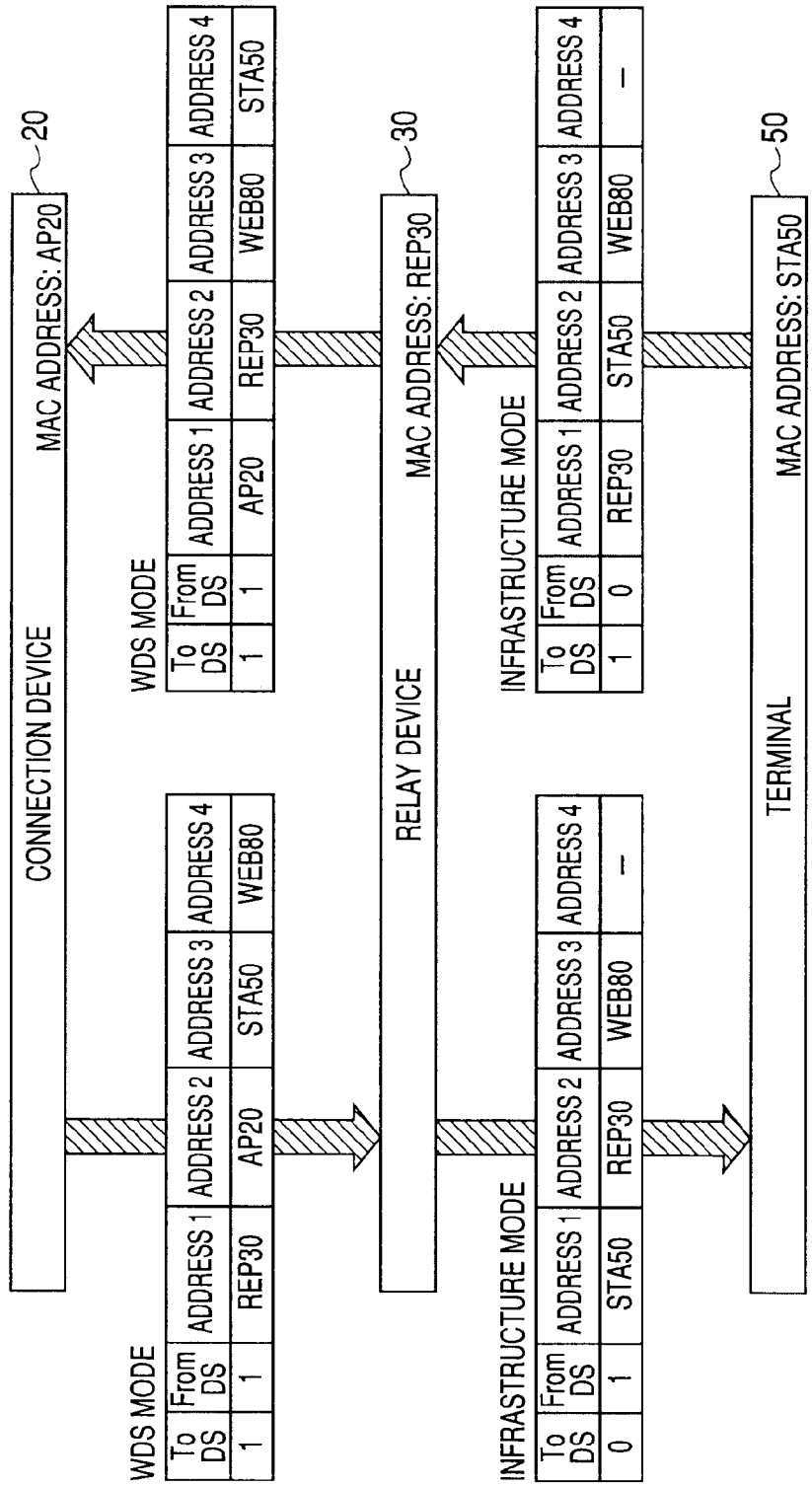
FIG. 11 is a schematic representation showing a data frame transferred among the connection device, the relay device, and the terminal.

FIG. 11 is a schematic representation showing a data frame transferred among the connection device 20, the relay device 30, and the terminal 50. FIG. 11 shows that each data frame includes a "To Distribution System (ToDS) field," a "From Distribution System (FromDS) field," and an "address field". If the ToDS field in the data frame is "1", this indicates that the reception station is a base station. If the ToDS field is "0", this indicates that the reception station is a terminal station. If the FromDS field in the data frame is "1," this indicates that the transmission station is a base station. If the FromDS field is "0," this indicates that the transmission station is a terminal station.

If data is transmitted from the terminal 50 to the web node 80, in the data frame in the infrastructure mode transmitted from the terminal 50 to the relay device 30, "1" is stored in the ToDS field and "0" is stored in the FromDS field. In the address field of the data frame, a MAC address of "REP30" for the relay device 30, which is a Basic Service Set Identifier (BSSID) is stored in address 1, a MAC address of "STA50" for the terminal 50 as the transmission source is stored in address 2, and a global address of "WEB80" for the web node 80 as the destination is stored in address 3.

Then, in the data frame in the WDS mode relayed by the relay device 30 to the connection device 20, "1" is stored in the ToDS field and "1" is stored in the FromDS field. In the address field of the data frame, MAC address of "AP20" of the connection device 20 of the reception station is stored in address 1, a MAC address of "REP30" for the relay device 30 as the transmission station is stored in address 2, a global address of "WEB80" for the web node 80 of the destination is stored in address 3, and a MAC address of "STA50" for the terminal 50 as the transmission source is stored in address 4.

On the other, if data is transmitted from the web node 80 to the terminal 50, in the data frame in the WDS mode relayed by the connection device 20 to the relay device 30, "1" is stored in the ToDS field and "1" is stored in the FromDS field. In the address field of the data frame, a MAC address of "REP30" for the relay device 30 as the reception station is stored in address 1, a MAC address of "AP20" for the connection device 20 as the transmission station is stored in address 2, a MAC address of "STA50" for the terminal 50 as the destination is stored in address 3, and a global address of "WEB80" for the web node 80 as the transmission source is stored in address 4.

Then, in the data frame in the infrastructure mode relayed by the relay device 30 to the terminal 50, "0" is stored in the ToDS field and "1" is stored in the FromDS field. In the address field of the data frame, a MAC address of "STA50" for the terminal 50 as the destination is stored in address 1, a MAC address of "REP30" for the relay device 30, which is a BSSID is stored in address 2, and a global address of "WEB80" for the web node 80 as the transmission source is stored in address 3.

According to the wireless communication system 10 in the embodiment as described above, data is transferred in the WDS mode between the connection device 20 and the relay device 30 connected in the infrastructure mode. Accordingly, to transfer data from the connection device 20 through the relay device 30 to the terminal 50, the data can be relayed without converting the destination MAC address of "STA50" in the relay device 30 since the data frame in the WDS mode already has the destination MAC address of "STA50". Conversely, to transfer data from the terminal 50 through the relay device 30 to the connection device 20, the data can be relayed without converting the transmission source MAC address "STA50" in the relay device 30. Consequently, data can be relayed between the wireless LANs 29 and 39 independently of a specific communication protocol. Additionally, since the connection device 20 and the relay device 30 are connected by executing the authentication conforming to the infrastructure mode, the connection device 20 and the relay device 30 can be connected in a secure state according to a user's desire.

In the embodiment, data is transferred in the WDS mode between the connection device 20 and the relay device 30 connected in the infrastructure mode. If multicast or broadcast communication is executed with the terminal 50 through the connection device 20, an appropriate communication rate rather than a fixed communication rate can be selected between the connection device 20 and the relay device 30 and arrival of data can also be checked since in the WDS mode since a communication rate can be appropriately determined and arrival of data can be checked in the WDS mode. Consequently, communication quality of data relayed between the wireless LANs 29 and 39 can be enhanced.

B. Other Modified Embodiment

While the present invention has been shown and described with reference to certain exemplary embodiments thereof, it will be understood by those skilled in the art that various changes in form and details may be made therein without departing from the spirit and scope of the invention as defined by the appended claims.

For example, in the embodiment, the wireless communication system is described. However, the present invention is not limited thereto. The present invention can applied to the connection device, or the relay device and can also be applied to various forms of a method of relaying data between wireless LANs, a program for controlling a computer of the connection device or the wireless LAN relay device, and the like.

What is claimed is:

1. A wireless communication system comprising:
a connection device which configures a first LAN which is a wireless LAN;
a relay device which configures a second LAN different from the first LAN and relays data between a LAN terminal connected to the second LAN and the connection device;
an authentication connection section which connects the relay device to the connection device through the first LAN by executing authentication conforming to an infrastructure mode based on a request from the relay device to the connection device, wherein
the connection device registers an attribute of the relay device as a terminal station in the infrastructure mode,
the relay device transmits a signal to the connection device, and
the connection device changes the attribute of the relay device registered in the connection device from the terminal station to a specific terminal station for executing data communication using a data frame conforming to a wireless distribution system different from the infrastructure mode; and
a data transfer section which transfers data to be communicated between the LAN terminal and the connection device by using the data frame conforming to the wireless distribution system between the connection device and the relay device connected by the authentication connection section.

2. The wireless communication system according to claim 1, wherein the second LAN is a wireless LAN, and the LAN terminal is connected to the relay device through the $2^{nd}$ LAN.

3. A connection device which configures a first LAN which is a wireless LAN, the device comprising:
a connection setting section which connects a relay device to the first LAN by executing authentication conforming to an infrastructure mode based on a request received from the relay device which configures a second LAN different from the first LAN; and
a data communication section which communicates data to be transferred to and from a LAN terminal connected to the second LAN by using a data frame conforming to a wireless distribution system different from the infrastructure mode, with the relay device connected by the connection setting section, wherein
the connection setting section includes
an assignment management section which manages an assignment table which registers therein a node connected to the first LAN;
a registration section which registers an attribute of the relay device in the assignment table as a terminal station in the infrastructure mode based on the authentication conforming to the infrastructure mode;
an attribute determination section which determines that the relay device is a specific terminal station for communicating data using a data frame conforming to the wireless distribution system, based on a signal received from the relay device registered in the assignment table as a terminal station in the infrastructure mode; and an attribute change section which changes the attribute registered in the assignment table for the relay device determined as the specific terminal station by the attribute determination section into the specific terminal station.

4. The connection device according to claim 3, wherein the data communication section comprises:

a data preparation section which prepares data to be transmitted to a node connected to the first LAN;

an attribute check section which checks an attribute of a destination node which is a destination of the data prepared by the data preparation section, by referencing the assignment table;

a first data transmission section which transmits the data prepared by the data preparation section by using a data frame conforming to the infrastructure mode if the attribute check section checks that the attribute of the destination node is a terminal station in the infrastructure mode; and a second data transmission section which transmits the data prepared by the data preparation section by using a data frame conforming to the wireless distribution system mode if the attribute check section checks that the attribute of the destination node is the specific terminal station.

5. The connection device according to claim 3, wherein the second LAN is a wireless LAN, and the LAN terminal is connected to the relay device through the $2^{nd}$ LAN.

6. A method for registering a relay device in a connection device which configures a first LAN which is a wireless LAN, the method comprising:

transmitting a connection request from the relay device to the connection device;

in response to the connection request, executing authentication conforming to an infrastructure mode in the connection device;

registering an attribute of the relay device in the connection device as a terminal station in the infrastructure mode;

transmitting a signal from the relay device to the connection device; and changing the attribute of the relay device registered in the connection device from the terminal station to a specific terminal station for executing data communication using a data frame conforming to a wireless distribution system different from the infrastructure mode.

7. The method according to claim 6, wherein the connection request is transmitted in response to the relay device receiving an access request from a LAN terminal connected to the relay device through a second LAN configured by the relay device.

8. A device that configures a first LAN, which is a wireless LAN, and registers a relay device, the device comprising:

a communication interface that receives a connection request from the relay device; and a processor that, in response to the connection request, executes authentication conforming to an infrastructure mode, and registers an attribute of the relay device as a terminal station in the infrastructure mode, wherein the communication interface receives a signal from the relay device, and the processor changes the registered attribute of the relay device from the terminal station to a specific terminal station for executing data communication using a data frame conforming to a wireless distribution system different from the infrastructure mode.

* * * * *